Nov. 17, 1959  F. F. HINES  2,913,691
TEMPERATURE COMPENSATED GAGE
Filed Dec. 22, 1958

INVENTOR
*Frank F. Hines*
BY

2,913,691

TEMPERATURE COMPENSATED GAGE

Frank F. Hines, Arlington, Mass., assignor to Baldwin-Lima-Hamilton Corporation, a corporation of Pennsylvania Application December 22, 1958, Serial No. 781,975

1 Claim. (Cl. 338—3)

This invention relates to temperature compensated resistance type strain gages and more particularly to bonded gages whose strain responsive filaments are made of foil although the principles of my invention are broadly applicable to unbonded resistance type gages whether the gage filament is wire, foil, or ribbon. The temperature effects which are compensated for in my present invention have to do with changes in resistance of the gage filaments with temperature. As shown in Ruge Patent No. 2,350,972 such temperature compensation is accomplished by providing two series connected filaments having different temperature co-efficients of resistance so that when the exact length of the two filaments is ascertained they produce a predetermined relationship to each other, preferably to balance each other so that the gage is insensitive to temperature changes.

If the gage filaments are in the form of wire it is possible to calculate the necessary proportion of resistances between the two wire filaments and then manufacture the gages with the precise length of wire to satisfy the calculations. This is possible because filament wire has a substantially constant unit resistance that can be relied upon. However, where gage filaments are made of foil, formed by etching a single sheet into a strain gage pattern, the resistances of the filaments can vary considerably due to lack of uniformity in the etching operation or to the difficulty of obtaining foil of uniform thickness. The lack of uniformity arising from either or both of these causes makes it difficult to calculate, with the necessary precision, the required length of filaments that would give substantially complete compensation. The result is that it has been extremely difficult in production operations to make temperature compensated etched foil-type strain gages of consistent uniformity. These same problems may arise with other materials, and also the principles of my invention for overcoming these difficulties may be applied, if desired, to wire gages in special situations.

It is an object of my present invention to provide an improved resistance type strain gage whose temperature co-efficient of resistance may be readily compensated for so that it is substantially constant during temperature changes.

A further object of my invention is to provide an improved foil type strain gage, and method of making the same, whereby the gages may be individually adjusted to obtain temperature compensation without changing the desired overall resistance of the gage, and still allow such gages to be made in production quantities at a reasonable cost.

Further objects and advantages will be more apparent to those skilled in the art from the following description of the accompanying drawings in which.

Figure 1:
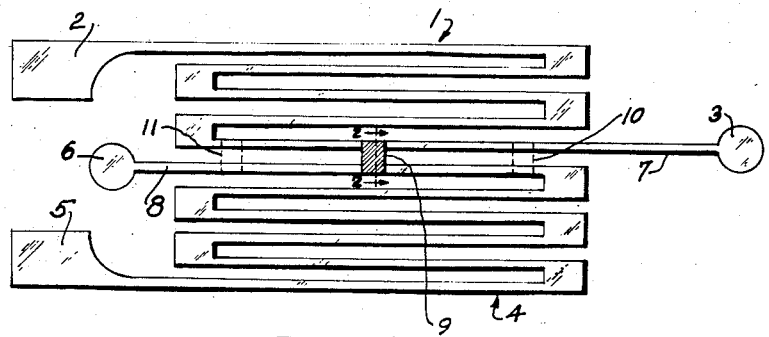
Fig. 1 is an enlarged plan view of my improved foil type gage.
Figure 2:
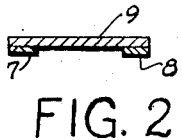
Fig. 2 is a sectional view taken substantially on the line of 2—2 of Fig. 1.

I have shown in Fig. 1 a typical grid pattern strain gage which, as is well known in the art, is normally bonded throughout its effective length to a member or test body subject to strain. Such a gage is broadly disclosed in Patent No. 2,292,549. The specific type of gage shown herein is made of electrically conductive foil, of any well-known strain gage material, formed into its configuration from a single continuous sheet which is etched to the pattern shown. The gage is formed of a filament section 1 having an input terminal 2 and a secondary terminal 3 while a second filament section 4 has an input terminal 5 and a secondary terminal 6. The terminals are either enlarged, as shown, or may be simply the ends of the filaments. The filaments 1 and 4 are formed of different materials having different predetermined temperature co-efficients of resistance, preferably of opposite signs, such materials being well known in the art. In prior art gages the last strands 7 and 8 of the two filaments terminate at a common end of the gage so that they may be cross-connected at that end to provide the series connection. In my invention I have these adjacent strands 7 and 8 respectively terminate at opposite ends of the gage and I series connect the two sections by splicing means 9, positioned at any selectable point along the strands 7 and 8 that will proportion the relative resistances of the two gage sections 1 and 4 so as to obtain the desired compensation.

To accomplish the proper proportioning, the resistance of gage section 1 may be determined by measuring the resistance between tabs 2 and 3, and similarly between tabs 5 and 6 for gage section 4. Knowing the actual resistances of the two gage sections it is now possible to calculate quickly the relative proportions of resistance necessary for compensation. Such calculations will determine the position of splicer element 9 which can then be laid in its exact position on the strands 7 and 8 and electrically connected thereto by soldering or other suitable means.

If it is necessary to obtain a larger proportion of resistance for gage section 1 the splicer element 9 would be near the end having auxiliary tab 3 as indicated by the dotted line position 10, and vice versa by placing the splicer element at dotted line position 11.

The position of the splicer element anywhere along the length of the filament strands between the extreme positions 10 and 11 has little effect upon the total resistance of the gage and will have zero effect if the two strands are the same resistance per unit length. However, the same movement of the splicer element will have substantial effect upon the ratio of the resistances of the two sections 1 and 2. Normally the two sections of the gage would be designed so that their resistance ratio is correct when the splicer element is attached at the mid-point of the strain gage grid, the splicer element being shown in such position in full lines in Fig. 1. Deviations from the desired resistance values can be accommodated by positioning the splicer element either right or left of the center shown. As previously stated, the position of the splicer element can be calculated from the measured resistance values of the two separate sections and the correctness checked after the splicer element is attached.

From the foregoing disclosure it is seen that I have provided a very effective temperature compensated gage and a method of making the same whereby it is possible to utilize two grid sections whose total resistance will remain constant but can be proportioned between the two sections so as to obtain a desired degree of temperature compensation regardless of variations in thickness or width of the foil material arising out of an etching operation or other causes.

It will, of course, be understood that various changes in details of construction and arrangement of parts may be made by those skilled in the art without departing from the spirit of the invention as set forth in the appended claim.

I claim:

A temperature compensated electrical resistance strain gage having two strain-sensitive filament sections, each section having one gage input terminal and one secondary terminal and each being of a desired electrical resistance as measured between its own said terminals, the filament materials of said sections respectively having different temperature co-efficients of resistance, said sections each including one of two adjacent spaced parallel filament strands, said strands having substantially equal electrical resistance per unit of length and terminating at said secondary terminals in opposite directions from each other, and means for electrically connecting said parallel strands together at a selectable point along their lengths so that the resistances of the portions of the two sections thus connected in series will bear a predetermined relationship to each other thereby to produce in the combined portions of said sections a predetermined change in electrical resistance with change in temperature while at the same time maintaining substantially a desired predetermined combined resistance of the two portions taken together in series as measured between said gage input terminals.

No references cited.